United States Patent
Fukuda et al.

(10) Patent No.: US 6,862,935 B2
(45) Date of Patent: Mar. 8, 2005

(54) TILT ANGLE MEASURING APPARATUS

(75) Inventors: Akiharu Fukuda, Hyogo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/670,367

(22) Filed: Sep. 26, 2003

(65) Prior Publication Data

US 2004/0060357 A1 Apr. 1, 2004

(30) Foreign Application Priority Data

Sep. 27, 2002 (JP) ........................................ 2002-283671

(51) Int. Cl.[7] .............................. G01C 9/02; H04B 7/00
(52) U.S. Cl. ...................... 73/602; 73/866.5; 73/432.1; 367/99
(58) Field of Search .......................... 73/602, 146, 628, 73/432.1, 431, 866.5; 367/96, 99, 188, 87, 125; 315/82; 342/61, 72

(56) References Cited

U.S. PATENT DOCUMENTS

| | | | | |
|---|---|---|---|---|
| 4,228,379 A | * | 10/1980 | Guscott et al. ............ | 310/322 |
| 4,677,595 A | * | 6/1987 | Obayashi et al. ............ | 367/13 |
| 4,754,440 A | * | 6/1988 | Naruse ........................ | 367/140 |
| 5,038,612 A | * | 8/1991 | Thelen et al. ................. | 73/493 |
| 6,085,592 A | * | 7/2000 | Kawashima .................. | 73/632 |
| 2003/0154792 A1 | * | 8/2003 | Katayama .................... | 73/602 |
| 2003/0156585 A1 | * | 8/2003 | Minami et al. ............. | 370/389 |

FOREIGN PATENT DOCUMENTS

| | | |
|---|---|---|
| JP | 55-144481 U | 4/1979 |
| JP | 56-8727 U | 1/1981 |
| JP | 61-125784 U | 8/1986 |
| JP | 63-101881 U | 7/1988 |

* cited by examiner

*Primary Examiner*—Hezron Williams
*Assistant Examiner*—Rose M Miller
(74) *Attorney, Agent, or Firm*—Sughrue Mion, PLLC

(57) ABSTRACT

A case of tilt angle measuring apparatus is composed of a case body for housing ultrasonic sensors and a cover for covering a top of the case body, and the case body includes a bottom plate having windows for exposing the ultrasonic wave transmitting/receiving faces of the ultrasonic sensors, a side plate extending upward from the peripheral edge of the bottom plate and abutting against the bottom surface of the cover, and horn parts extending downward from the bottom plate so as to surrounding the windows.

8 Claims, 4 Drawing Sheets

TILT ANGLE MEASURING APPARATUS

BACKGROUND OF THE INVENTION

1. Field of the Invention

This invention relates to a tilt angle measuring apparatus that is mounted on a bottom surface of a vehicle, for example, and measures a tilt angle of the vehicle with respect to a road by a transmitted wave which is emitted toward a road surface and a received wave which is reflected by the road surface.

2. Description of the Related Art

This kind of conventional tilt angle measuring apparatus is provided with an ultrasonic wave generating device for generating an ultrasonic wave, a pair of front and rear sonars that emit the ultrasonic waves which are generated by the ultrasonic wave generating device toward a driving road, and detect a signal reflected by the driving road, and a reflection signal processing device that determines distances between two sonars on a vehicle and the driving road from the signals detected by these sonars (for example, see a patent document 1: Japanese Unexamined Patent Publication No. 56-8727).

On the other hand, an ultrasonic wave transmitting/receiving device provided with a pair of ultrasonic vibrators is disclosed. In this ultrasonic wave transmitting/receiving device, one ultrasonic vibrator is used for emitting the ultrasonic wave and the other ultrasonic vibrator is used for receiving the ultrasonic wave. In both of the ultrasonic vibrators, a pair of horns of the same shape are arranged in parallel and integrally formed of resin. Each of the horns has a diameter which gradually increases from a throat portion to an opening portion and both of the horns are integrally connected to each other in such a way that each opening portion opens at a baffle portion that is a nearly rectangular plate. Then, a baffle face of an outer surface of the baffle portion is divided by concave grooves or convex walls thereby to reduce the ultrasonic wave emitted from one ultrasonic vibrator toward an object being diffracted and received by the other ultrasonic vibrator (for example, see a patent document 2: Japanese Unexamined Utility Model Publication No. 55-144481).

As is understood from a rectangular side face of the sonar, it is thought that wave energy of a signal reflected by the driving road becomes weak because the ultrasonic wave emitted by the sonar is diffused in a wide range. In order to solve this weak wave energy problem, it is necessary to electrically amplify the weak ultrasonic wave detected by the sonar. However, amplifying the weak ultrasonic wave inevitably amplifies ambient noises at the same time, so that it is thought difficult to discriminatively detect the ultrasonic wave which is desired to detect from the ambient noises (for example, see the patent document 1).

On the other hand, in the ultrasonic wave transmitting/receiving device, the pair of horns of the same shape of both of the ultrasonic vibrators, are arranged in parallel and integrally formed of resin. Thus, in an occasion where the horn is damaged, the whole horns including both of the ultrasonic vibrators need to be replaced. Moreover, an inclined face that is an inner surface of the horn is connected to the baffle face that is an outer surface of the baffle portion, by one bending portion. Thus, a sufficiently large amount of wave energy exists near the bending portion and a part of the whole wave energy but not a little wave energy, is diffused in a lateral direction along the baffle face. In other words, it is thought that an amount of wave energy diffracted in a direction parallel to the baffle face, that is, in a direction lateral to a direction in which the wave energy travels, becomes large by diffraction phenomenon and that the wave energy cannot be concentrated in a target direction (for example, see patent document 2).

At the same time, since the ultrasonic wave transmitting/receiving faces of the sonars are bared at the case, it is thought that bounced stones directly hit the ultrasonic wave transmitting/receiving faces and splashed water enters into the sonars (for example, see patent document 1). In addition, it is also possible to come up with an idea of the case provided with the horns, but in this occasion it is thought that the horns are damaged by bounced stones (for example, see patent document 1 and patent document 2).

SUMMARY OF THE INVENTION

This invention has been made to solve the above described problems. A first object of the present invention is to provide a tilt angle measuring apparatus capable of improving measuring accuracy without excessively electrically amplifying a signal.

And a second object of the present invention is to provide a tilt angle measuring apparatus capable of easily coping with an occasion where a case of the measuring apparatus is damaged by stoned bouncing off a road surface.

The tilt angle measuring apparatus in accordance with the present invention is characterized by that a case of the apparatus is made to include a case body for housing ultrasonic sensors and a cover for covering an upper portion of the case body, and the case body is provided with a bottom plate having windows each of which exposes an ultrasonic wave transmitting/receiving face of each of the ultrasonic sensors, a side plate extending upward from a peripheral edge of the bottom plate and abutting against a bottom surface of the cover, and horn parts each of which extends downward from the bottom plate so as to surround each of the windows in order to improve the measuring accuracy without excessively electrically amplifying a signal.

By this arrangement in accordance with the present invention the case is provided with the horn parts, so that it is possible to improve directivity of the ultrasonic wave by the horns and hence to improve measuring accuracy without excessively electrically amplifying a signal. Further, by the horn parts, it is possible to reduce a tendency that stones and water bouncing off the road surface directly hit the ultrasonic sensors, and hence to reduce the degree of damage of the ultrasonic sensors which leads to improving reliability of these components.

Moreover, the tilt angle measuring apparatus in accordance with the present invention is characterized by that a case of the apparatus is made to include a case body arranged on a vehicle side, a holder that holds ultrasonic sensors and is supported in the case body, and a cover that has horn parts directly below the ultrasonic sensors and covers a lower portion of the holder in order to easily cope with an occasion when the horn part is damaged.

By this arrangement in accordance with the present invention it is possible to replace only the cover and hence to easily cope with an occasion where the horn part is damaged by bounced stones or the like.

DETAILED DESCRIPTION OF THE PREFERRED EMBODIMENTS

The preferred embodiments of the present invention will be described below.

Embodiment 1

Figure 1:
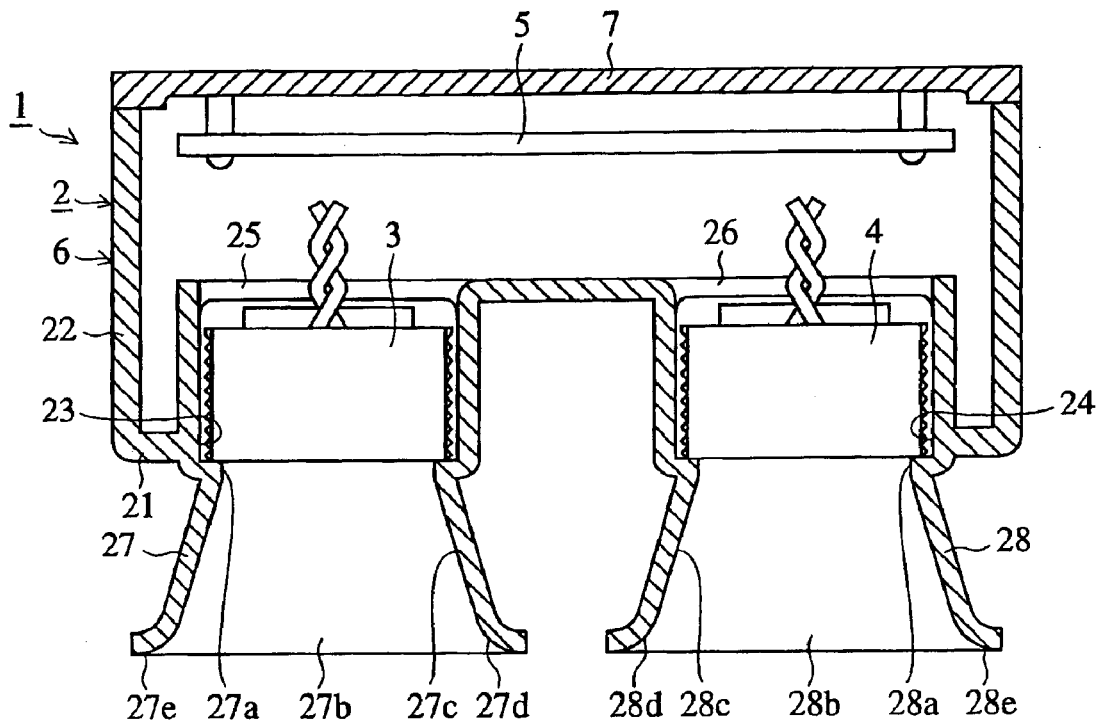
FIG. 1 is a partial cross sectional view to show a tilt angle measuring apparatus in accordance with embodiment 1 of the present invention.

FIG. 1 is a partial cross sectional view to show a tilt angle measuring apparatus in accordance with embodiment 1 of the present invention. In FIG. 1, the tilt angle measuring apparatus 1 is composed of a case 2 that is fixed to the bottom of a vehicle body, a pair of front ultrasonic sensor 3 and rear ultrasonic sensor 4 which are arranged at a lower portion in the case 2 and emit the ultrasonic wave to a road surface and receive the ultrasonic wave reflected by the road surface, another two front and rear ultrasonic sensors 3', 4' (not shown) that are similarly arranged with the ultrasonic sensors 3, 4 on opposite side of the ultrasonic sensors 3, 4 in parallel to them in the case 2, and a circuit board (signal processing means) 5 that is arranged at an upper portion in the case 2 and controls all of the ultrasonic sensors 3, 3', 4, 4'. Because the ultrasonic sensors 3', 4' have the same function and composition with the ultrasonic sensors 3, 4, hereinafter further description about the ultrasonic sensors 3', 4' which are not shown in the drawings will be omitted. Then, the case 2 is composed of a case body 6 that houses the ultrasonic sensors 3, 4 and a rectangular cover 7 that supports the circuit board 5 and covers the upper portion of the case body 6. At this point, each of the ultrasonic sensors 3, 4 houses, for example, a ceramic vibrator and it is made to have a cylindrical outside shape.

Figure 2:
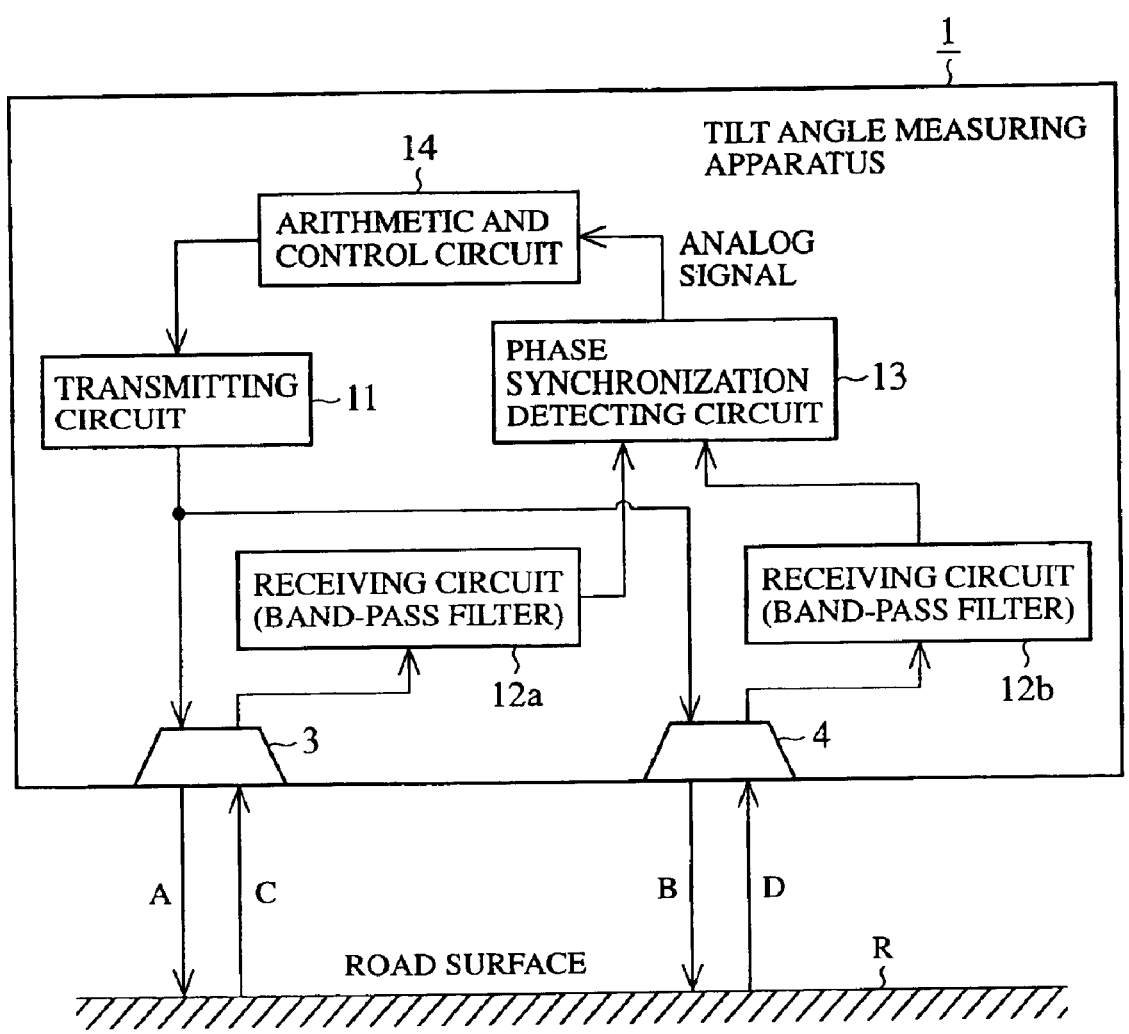
FIG. 2 is a block diagram to show the tilt angle measuring apparatus in accordance with the embodiment 1 of the present invention.

FIG. 2 is the block diagram of the tilt angle measuring apparatus 1 and functional components other than the ultrasonic sensors 3, 4 are composed in the circuit board 5. That is, the circuit board 5 is provided with functional components of a transmitting circuit 11 that generates pulses each having a specific frequency and supplies them to each of the ultrasonic sensors 3, 4, receiving circuits 12a, 12b (bandpass filters) each of that extracts a specific frequency component from the frequency pulses which are received by each of the ultrasonic sensors 3, 4 and converted to electric signals, a phase synchronization detecting circuit 13 that compares received waveforms extracted from these receiving circuits 12a, 12b and generates a phase difference signal between them, and an arithmetic and control circuit 14 that computes an angle of tilt of the vehicle with respect to a road surface R according to the phase difference signal.

The case body 6 has a bottom plate 21 of the same size as the cover 7 and a side plate 22 extends upward from the peripheral edge of the bottom plate 21 and abuts against bottom surface of the cover 7. Circular windows 23, 24 to expose bottom surfaces of the ultrasonic sensors 3, 4, are formed in the bottom plate 21 and cylindrical parts 25, 26 each tightly housing the ultrasonic sensors 3, 4 from above, are formed on the top surface of the bottom plate 21 so as to surround the windows 23, 24, respectively.

At this point, in many cases, the tilt angle measuring apparatus 1 of this kind is made to measure a tilt angle within a small range. Thus, in an occasion where measuring dynamic range of the tilt angle is ±10 degrees, a range of ±10 degrees is sufficient for expanse of the ultrasonic waves which are transmitted from respective ultrasonic sensors 3, 4 and thus the ultrasonic waves do not need to be diffused in a wide range. Therefore, in this embodiment 1, horn parts 27, 28 that imparts directivity to the ultrasonic waves, are integrally formed downward from the bottom plate 21 such that they are located directly below the ultrasonic sensors 3, 4, respectively.

The horn parts 27, 28 have upper openings 27a, 28a which are smaller in diameter than bottom surfaces of the ultrasonic sensors 3, 4, lower openings 27b, 28b, which are spaced downward by a predetermined distance from the upper openings 27a, 28a and are larger in diameter than the upper openings 27a, 28a, slanted faces 27c, 28c, tilting outward from the upper openings 27a, 28a toward the lower openings 27b, 28b, and curved faces 27d, 28d, smoothly expanded downward from bottom ends of the slanted faces 27c, 28c. At the lowermost ends of these curved surfaces 27d, 28d are made horizontal opening faces 27e, 28e including the lower openings 27b, 28b, respectively. The curved faces 27d, 28d are made as portions for reducing wave energy diffracted in a lateral direction by diffraction, respectively.

At this point, in an occasion where the horn parts are not provided but the vibration faces of the ultrasonic sensors 3, 4 are exposed at the windows 23, 24, if areas of these vibration faces can be sufficiently expanded, directivity of the ultrasonic wave is improved and hence a sufficient electric signal can be obtained from an ultrasonic wave with low energy. If areas of the vibration faces are equal to those of the lower openings 27b, 28b of the horn parts 27, 28, respectively, the ultrasonic sensors 3, 4 with wide exposed vibration faces are thought to have equal characteristics to the ultrasonic sensors 3, 4 with the horn parts 27, 28, respectively. However, in order to vibrate the vibration faces as a single vibration face, the ceramic vibrator needs to have expanded vibration face. Further, in order to easily vibrate the vibration face, the vibration face needs to be made thinner, which is actually difficult from the viewpoint of machining. Still further, in an occasion where area of the vibration face is wide, it makes a possibility higher that small stones bounce off the road and hit the vibration face. For these reasons, it is preferable that the vibration face is made small in area and made to have a moderate strength, and hence the vibration faces of the ultrasonic sensors 3, 4 of this embodiment 1 are also made small in area and made to have moderate strength, respectively.

Further, the reason why the slanted faces 27c, 28c of the horn parts 27, 28 are connected to the opening faces 27e, 28e by the curved faces 27d, 29d are as follows: that is, when the ultrasonic wave motion passes by the bending portion, because the wave motion near the bending portion is changed in direction along a new face by a diffraction phenomenon, in an occasion where the slanted faces 27c, 28c are respectively connected to the opening faces 27e, 28e by one bending portion, sufficiently large wave energy exists near each of the bending portions, and a part of whole wave energy but not a little wave energy is diffused in a lateral direction along the new face; whereas in an occasion where two bending portions are provided, the wave energy near a first bending portion is a little changed in direction by the first bending portion and the wave energy is reduced by an amount of expansion in the range of radiation in this wave motion whose direction is changed. Then, in a second bending portion, a direction of the wave motion near the second bending portion whose wave energy has already been reduced by the first bending portion, is changed again. At this point, the wave energy changed in direction by the second bending portion is still a smaller part of a part of the whole wave energy and hence wave energy which is diffracted in a lateral direction by the diffraction phenomenon is a little. Thus, as a number of bending portions becomes larger and hence the amount of wave energy changed in direction at one bending portion becomes smaller, the amount of wave energy diffracted in the lateral direction becomes smaller. Therefore, the curved faces 27d, 28d of this embodiment 1 each corresponding to providing an infinite number of bending portions, are much preferable so as to prevent the wave energy from being diffracted and lost in the lateral direction.

When this tilt angle measuring apparatus 1 is assembled, the ultrasonic sensors 3, 4 are pressed into the cylindrical parts 25, 26 from above with the cover 7 being removed thereby to put the bottom end portions of the ultrasonic sensors 3, 4 into the windows 23, 24, then the bottom faces of the ultrasonic sensors 3, 4 are exposed at the windows 23, 24, respectively. And the cover 7 is put on the top of the side plate 22 of the case body 6 and is fixed there by fixing screws (not shown).

In the tilt angle measuring apparatus 1 composed as above described manner, the arithmetic and control circuit 14 sends an intermittent command to the transmitting circuit 11. Then, the transmitting circuit 11 generates pulses of a specific frequency according to the command from the arithmetic and control circuit 14 and supplies the pulses to the ultrasonic sensors 3, 4. The ultrasonic sensors 3, 4 transmit the ultrasonic waves A, B which have the same phase to the road surface R, respectively. These ultrasonic waves A, B hit the road surface R and are reflected thereby and the ultrasonic waves C, D which are reflected by the road surface R, are received by the ultrasonic sensors 3, 4, respectively. In these processes, the horn parts 27, 28 concentrate the ultrasonic waves in a narrow range in both of the processes of transmitting and receiving the ultrasonic waves to increase energy per a unit of area.

The ultrasonic sensors 3, 4 which receive the ultrasonic waves C, D, convert them to electric signals of pulses with frequencies that correspond to the ultrasonic waves C, D and send them to the phase synchronization detecting circuit 13 via the receiving circuits 12a, 12b, respectively. The phase synchronization detecting circuit 13 compares the received waveforms of the pulses sent from the receiving circuits 12a, 12b. Thus, when the vehicle is parallel to the road surface R, the ultrasonic sensors 3, 4 receive the ultrasonic waves C, D at the same timing and hence the phases of the ultrasonic waves C, D are equal to each other. When the vehicle is tilted forward with respect to the road surface R, the front ultrasonic sensor 3 receives the reflected wave earlier than the rear ultrasonic sensor 4 and hence the ultrasonic wave C received by the ultrasonic sensor 3 advances in the phase as compared with the ultrasonic wave D received by the ultrasonic sensor 4. Then, when the vehicle is tilted backward with respect to the road surface R, the front ultrasonic sensor 3 receives the reflected wave later than the rear ultrasonic sensor 4 and hence the ultrasonic wave C received by the ultrasonic sensor 3 delays in the phase as compared with the ultrasonic wave D received by the ultrasonic sensor 4.

In this embodiment 1, since the case 2 is provided with the horn parts 27, 28, in both of the processes of transmitting and receiving the ultrasonic waves, it is possible to enhance the directivities of the ultrasonic waves A, B, C, D and hence to become focused the ultrasonic waves in a narrow range. That is, in the process of transmitting the ultrasonic waves A, B, it is possible to reflect the ultrasonic waves A, B with their intensities per a unit of area enhanced and in the process of receiving the ultrasonic waves C, D, it is possible to receive the ultrasonic waves C, D as the reflected wave with their intensities per a unit of area enhanced. Thus, it is possible to raise S/N ratios of the ultrasonic waves A to D and hence to improve the measuring accuracy without excessively electrically amplifying signals from the ultrasonic sensors 3, 4. In addition, by the horn parts 27, 28, it is possible to reduce a tendency that stones and water bouncing off the road surface directly hit the ultrasonic sensors 3, 4 and hence to reduce the degree of damage of the ultrasonic sensors 3, 4, which leads to improving a reliability of these components.

Further, since the slanted faces 27c, 28c of the horn parts 27, 28 are connected to the opening faces 27e, 28e by the smooth curved faces 27d, 28d, the amount of wave energy diffracted in the lateral direction by the diffraction phenomenon can be reduced thereby to concentrate the wave energy in a target direction, which results in further improving the measuring accuracy.

Still further, since there are provided cylindrical parts 25, 26 that extend upward from the bottom plate 21 so as to surround the windows 23, 24 and receive the ultrasonic sensors 3, 4 from above, the ultrasonic sensors 3, 4 can be easily fixed in the case 2 and at the same time in an occasion where the case 2 is damaged, only the case 2 can be easily replaced.

embodiment 2

Figure 3:
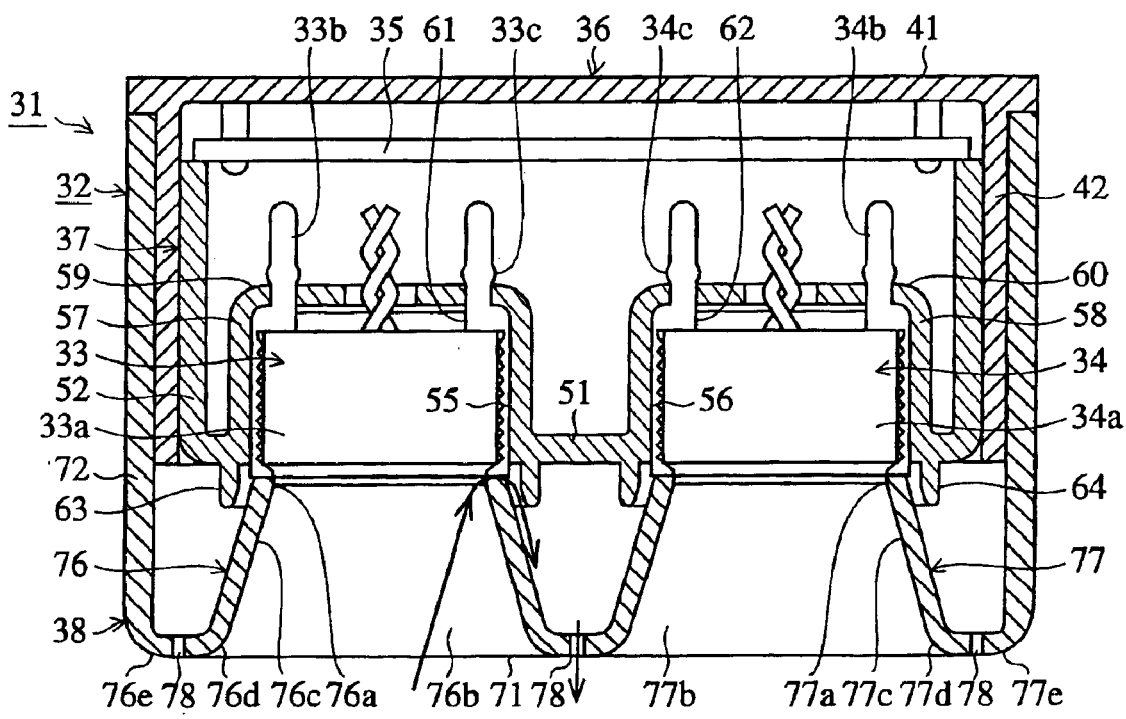
FIG. 3 is a partial cross sectional view to show a tilt angle measuring apparatus in accordance with embodiment 2 of the present invention.
Figure 4:
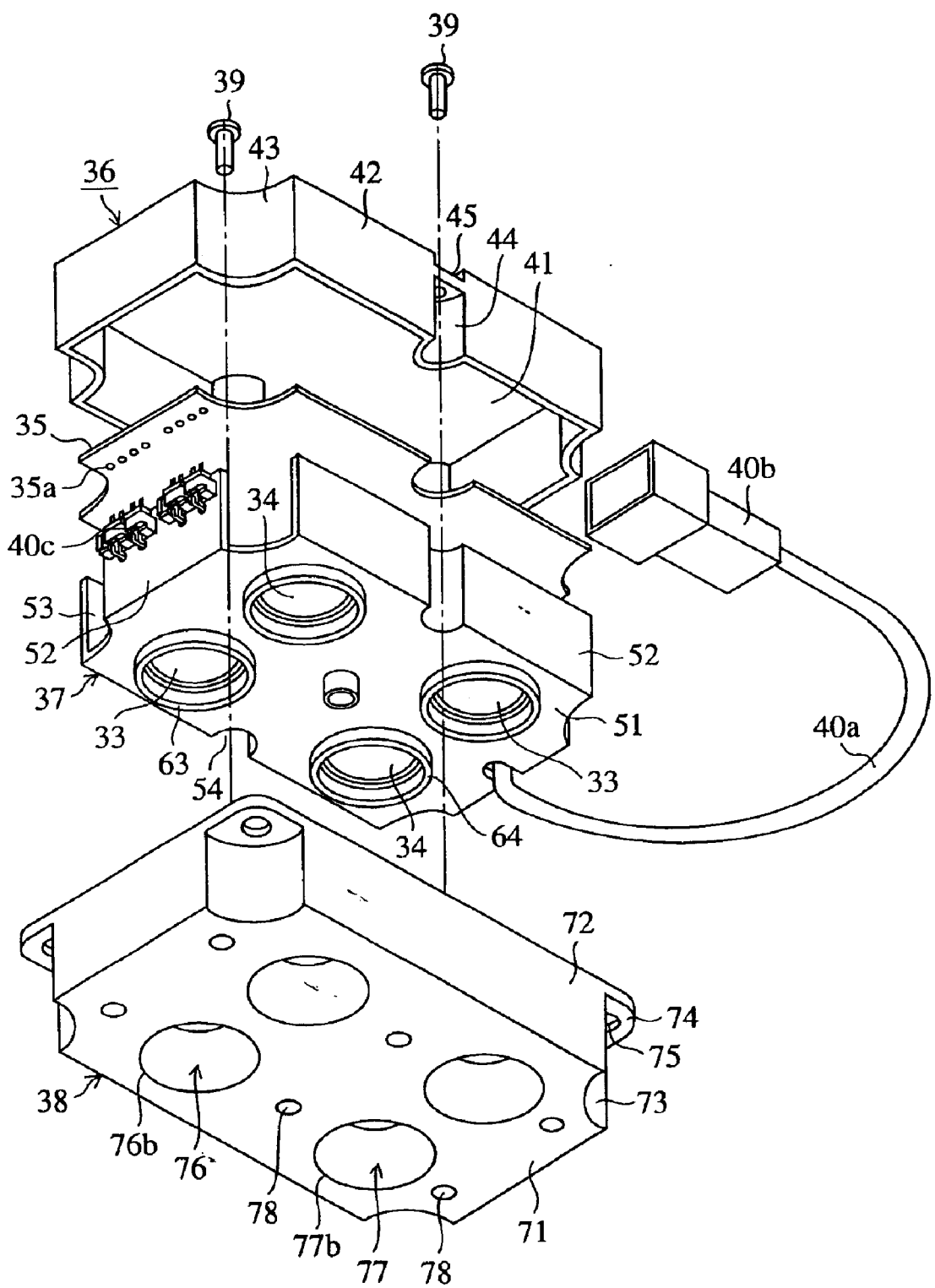
FIG. 4 is an exploded perspective view to show the tilt angle measuring apparatus in accordance with embodiment 2 of the present invention.

At this point, in the embodiment 1, the ultrasonic sensors 3, 4 are held by the cylindrical parts 25, 26 which are made integrally with the horn parts 27, 28, but if they are composed in a manner shown in a partial cross sectional view in FIG. 3 and an exploded perspective view in FIG. 4, they can be easily cope with an occasion when the horn parts are damaged. That is, the tilt angle measuring apparatus 1 according to the embodiment 2 has a case 32, ultrasonic sensors 33, 34, and a circuit board 35 which correspond to the case 2, the ultrasonic sensors 3, 4, and the circuit board 5 in the embodiment 1, respectively. Moreover, the case 32 has a case body 36 which is similar to the cover 7 in the embodiment 1, a holder 37 that holds the ultrasonic sensors 33, 34 and is supported by the case body 36, and a cover 38 which is fixed to the case body 36 so as to cover the lower portion of the holder 37. The case body 36, the holder 37 and the cover 38 are fixed by a plurality of fixing screws 39. At this point, the circuit board 35 is connected to a power source on the vehicle side by a cable 40a and a connector 40b and the respective ultrasonic sensors 33, 34 are connected to terminals 35a of the circuit board 35 via connectors 40c which are provided on a side plate 52 of the holder 37.

Functions of the ultrasonic sensors 33, 34 are similar to those of the ultrasonic sensors 3, 4 in the embodiment 1, whereas outside shapes of the ultrasonic sensors 33, 34 are slightly different from those of the ultrasonic sensors 3, 4 in the embodiment 1. That is, the ultrasonic sensors 33, 34 have main bodies 33a, 34a and legs 33b, 34b which are provided in a protruding manner on top surfaces of the main bodies 33a, 34a, respectively, and engaging protrusions 33c, 34c are formed on the outer peripheral surfaces of the legs 33b, 34b, respectively.

The case body 36 has a top plate 41 which corresponds to the cover 7 in the embodiment 1 and a frame shaped or cylindrical side plate 42 which integrally extends downward from near an outer peripheral edge of bottom surface of the top plate 41. Recessed portions 43 are formed in the corners of the top plate 41 and the side plate 42 and recessed portions 44 are formed at substantial middle point of sides in a longer direction of the top plate 41 and the side plate 42, respectively, and seating portions 45 for the fixing screws 39 are formed in the recessed portions 44, respectively.

The holder 37 has a rectangular bottom plate (first bottom plate) 51 and a side plate (first side plate) 52 extends from an outer peripheral edge of the top surface of the bottom plate 51 to an inside of the side plate 42 of the case body 36, and an outer surface of the side plate 52 of the holder 37 contacts an inner surface of the side plate 42 of the case body 36. Then, cutaway or recessed portions 53, 54 which correspond to the recessed portions 43, 44 of the case body 36 are formed also in the side plate 52 of the holder 37. Then, circular windows 55, 56 to expose the ultrasonic wave transmitting/receiving surfaces of the ultrasonic sensors 33, 34, are formed in the bottom plate 51. Moreover, cylindrical parts 57, 58 to tightly house the main bodies 33a, 34a of the ultrasonic sensors 33, 34 extend upward from an inner surface of the bottom plate 51 of the holder 37 so as to surround the windows 55, 56, respectively. Top walls 59, 60 are provided on the tops of the cylindrical parts 57, 58. In these top walls 59, 60 are formed through holes 61, 62 through which the legs 33b, 34b of the ultrasonic sensors 33, 34 are tightly passed, respectively. Then, bosses 63, 64 are provided downward in a protruding manner on the bottom surface of the bottom plate 51 so as to surround the windows 55, 56, respectively.

The cover 38 has a rectangular bottom plate (second bottom plate) 71 and a side plate (a second side plate) 72 extends upward from an outer peripheral edge of the top surface of the bottom plate 71 and an inner surface of the side plate 72 of the cover 38 contacts the outer surface of the side plate 42 of the case body 36. In the bottom plate 71 and the side plate 72 are formed recessed portions 73 which correspond to the recessed portions 43 of the case body 36 and the recessed portions 53 of the holder 37. Then, fixing portions 74 used for fixing the cover 38 to the bottom surface of the vehicle, are formed in the recessed portions 73 in a manner protruded from the top edge of the side plate 72. Through holes 75 through which fixing screws (not shown) are passed, are formed in the fixing portions 74, respectively. Horn parts 76, 77 extend upward from the bottom plate 71 of the cover 38 between the bottom plate 51 of the holder 37 and the bottom plate 71 of the cover 38. At this point, the top end surfaces of the horn parts 76, 77 are nearly adjacent to the bottom surfaces of the ultrasonic sensors 33, 34, respectively. Then, water draining holes 78 are formed in the bottom plate 71 at the positions outside the horn parts 76, 77.

The horn parts 76, 77 have upper openings 76a, 77a which are smaller in diameter than the bottom surfaces of the ultrasonic sensors 33, 34; lower openings 76b, 77b which are formed in the bottom plate 71 and are larger in diameter than the upper openings 76a, 77a; slanted faces 76c, 77c which tilt outward from the upper openings 76a, 77a to the lower openings 76b, 77b; and curved faces 76d, 77d which smoothly expand downward from the bottom ends of the slanted faces 76c, 77c, respectively. The lowermost ends of these curved faces 76d, 77d are made to be horizontal opening faces 76e, 77e including the lower openings 76b, 77b, and the curved faces 76d, 77d are made to be portions for reducing the wave energy diffracted in the lateral direction by diffraction.

When this tilt angle measuring apparatus 31 is assembled, the ultrasonic sensors 33, 34 are pressed into the cylindrical parts 57, 58 from the windows 55, 56 of the holder 37 with the cover 38 being removed. With this operation, the legs 33b, 34b of the ultrasonic sensors 33, 34 are protruded upward from the through holes 61, 62 and the main bodies 33a, 34a of the ultrasonic sensors 33, 34 are tightly fitted in the cylindrical parts 57, 58, respectively. At this time, the engaging protrusions 33c, 34c of the ultrasonic sensors 33, 34 are engaged with the top faces of the top walls 59, 60, respectively. Then, the holder 37 which holds the ultrasonic sensors 33, 34, is fitted in the case body 36 which supports the circuit board 35, and the cover 38 is mounted on the case body 36 and the holder 37. Then, these parts are fixed to each other with fixing screws 39.

The tilt angle measuring apparatus 31 which is composed as above stated manner, acts in the same manner as the tilt angle measuring apparatus 1 in the embodiment 1 and it can produce the same effect as the embodiment 1. In addition, since the horn parts 76, 77 are made in one body with the bottom plate 71, the frequency of happening that the horn parts 76, 77 are damaged, can be reduced as compared with a case of the embodiment 1. Then, in an occasion where the cover 38 is damaged by stones bouncing off the road surface, only the cover 38 can be replaced, and it causes a reducing cost which is required to repair the cover 38, that is, improving maintainability.

Further, since the slanted faces 76c, 77c of the horn parts 76, 77 are respectively connected to the opening faces 76e, 77e by the smooth curved faces 76d, 77d, as is the case with the embodiment 1, it is possible to reduce the wave energy diffracted in the lateral direction by the diffraction phenomena and to concentrate the wave energy to a target direction, these cause to further improve the measuring accuracy.

Still further, since there are provided the cylindrical parts 57, 58 each extending upward from the bottom plate 51 of the holder 37 so as to surround the windows 55, 56 and housing the ultrasonic sensors 33, 34 from below, it is possible to easily fix the ultrasonic sensors 33, 34 in the case 32. At this time, the legs 33b, 34b of the ultrasonic sensors 33, 34 are respectively passed through the through holes 61, 62 of the top walls 59, 60, and the engaging protrusions 33c, 34c which are formed on the outer peripheral faces of the legs 33b, 34b, are respectively engaged with edges of the through holes 61, 62, so that it is possible to prevent the ultrasonic sensors 33, 34 from being moved downward.

Then, since the water draining holes 78 are formed in the bottom plate 71 of the cover 38, it is possible to drain out water hitting the bottom surfaces of the ultrasonic sensors 33, 34 and flowing between the bottom surfaces of the ultrasonic sensors 33, 34 and the top end surfaces of the horn parts 76, 77 to the outsides of the horn parts 76, 77 and hence to prevent the water from accumulating in the cover 38.

Embodiment 3

Figure 5:
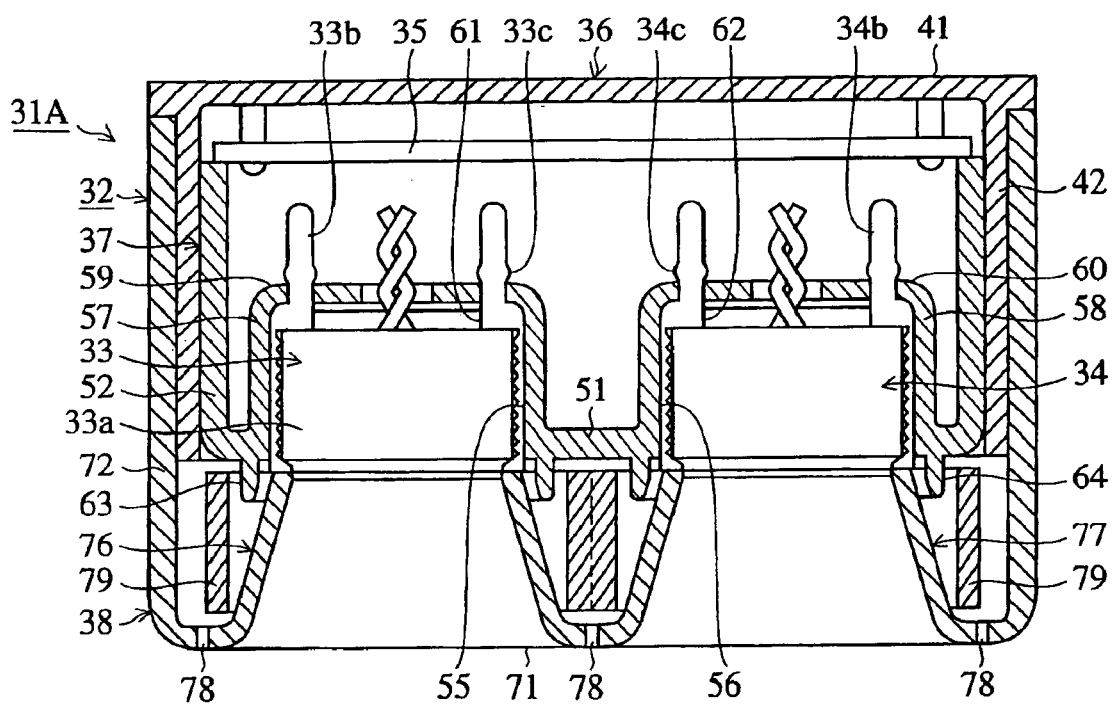
FIG. 5 is a partial cross sectional view to show a tilt angle measuring apparatus in accordance with embodiment 3 of the present invention.

FIG. 5 is a cross sectional view to show a tilt angle measuring apparatus 31A in accordance with embodiment 3. While the tilt angle measuring apparatus 31A in accordance with this embodiment 3 is made to be similar as a whole to the tilt angle measuring apparatus 31 in accordance with the embodiment 2, however, ultrasonic wave absorbing members 79 for absorbing the ultrasonic wave are arranged in the cover 38. Each of the ultrasonic wave absorbing members 79 can be shaped like a cylinder to surround the whole of each of the horn parts 76, 77 and preferably, is fixed to the cover 38 so as not to interfere with the flow of splashed water. At this point, it is needless to say, the ultrasonic wave absorbing members 79 may be members for intercepting the ultrasonic waves.

According to this embodiment 3, the ultrasonic wave absorbing members 79 are arranged outside the horn parts 76, 77, so that it is possible to prevent the ultrasonic waves transmitted from the ultrasonic sensors 33, 34 from reflecting or traveling in a straight line in the cover 38 thereby to be supplied to the adjacent ultrasonic sensors 33, 34. Thus, it is possible to detect only the objective ultrasonic wave which are reflected by the road surface R by means of the ultrasonic sensors 33, 34. Therefore, it is possible to further improve the measuring accuracy as compared with the embodiments 1, 2. In particular, in an occasion where the distances between the ultrasonic sensors 33, 34 and the road surface R are short and hence the time difference between the transmitted wave and the received wave is small, the ultrasonic wave absorbing members 79 are effective.

By the way, in the above description, the tilt angle measurement devices are composed in such a way that tilt angles both in a back-and-forth direction and in a left-and-right direction of the vehicle are measured, but needless to say, the tilt angle measuring apparatus can be easily composed in such a way that the tilt angle either in a back-and-forth direction or in a left-and-right direction of the vehicle is measured. Moreover, in the above description, the case 2 and the case 32 are shaped in a rectangular cylinder or frame, but it is not intended to limit their shapes to these kinds of shapes.

What is claimed is:

1. A tilt angle measuring apparatus comprising:
    a plurality of ultrasonic sensors, each of which has a function of transmitting an ultrasonic wave to a road surface and a function of receiving the ultrasonic wave reflected by the road surface;
    signal processing means that control these ultrasonic sensors and compute a tilt angle of the road surface from signals detected by the ultrasonic sensors; and
    a case that houses the ultrasonic sensors and the signal processing means, wherein
    the case includes a case body for housing the ultrasonic sensors and a cover for covering an upper portion of the case body, and
    the case body is provided with a bottom plate having windows, each of which exposes an ultrasonic wave transmitting/receiving face of each of the ultrasonic sensors, a side plate extending upward from a peripheral edge of the bottom plate and abutting against a bottom surface of the cover, and horn parts, each of which extends downward from the bottom plate so as to surround each of the windows.

2. A tilt angle measuring apparatus comprising:
    a plurality of ultrasonic sensors, each of which has a function of transmitting an ultrasonic wave to a road surface and a function of receiving the ultrasonic wave reflected by the road surface;
    signal processing means that control these ultrasonic sensors and compute a tilt angle of the road surface from signals detected by the ultrasonic sensor; and
    a case that houses the ultrasonic sensors and the signal processing means, wherein
    the case includes a case body arranged on a vehicle side, a holder that holds the ultrasonic sensors and is supported in the case body, and a cover that has horn parts directly below the ultrasonic sensors and covers a lower portion of the holder.

3. The tilt angle measuring apparatus as claimed in claim 2, wherein the holder includes a first bottom plate having windows, each of which exposes an ultrasonic wave transmitting/receiving face of each of the ultrasonic sensors and a first side plate extending upward from a peripheral edge of the first bottom plate, and the cover includes a second bottom plate that has lower openings for passing the ultrasonic wave and is arranged apart from the first bottom plate, a second side plate extending upward from a peripheral edge of the second bottom plate, and the horn parts so as to extend from the lower openings to bottom surfaces of the ultrasonic sensors, respectively.

4. The tilt angle measuring apparatus as claimed in claim 2, wherein inner slanted faces of the horn parts are connected to lower opening faces by smooth curved faces, respectively.

5. The tilt angle measuring apparatus as claimed in claim 3, further comprising cylindrical parts that extend upward so as to surround the windows from the bottom plate and house the ultrasonic sensors from below, respectively.

6. The tilt angle measuring apparatus as claimed in claim 5, further comprising means for engaging the ultrasonic sensors with the cylindrical parts, respectively.

7. The tilt angle measuring apparatus as claimed in claim 2, wherein the cover has water draining holes.

8. The tilt angle measuring apparatus as claimed in claim 2, further comprising members that are arranged to surround the horn parts and absorb or interrupt the ultrasonic wave.

* * * * *